United States Patent Office 2,950,837
Patented Aug. 30, 1960

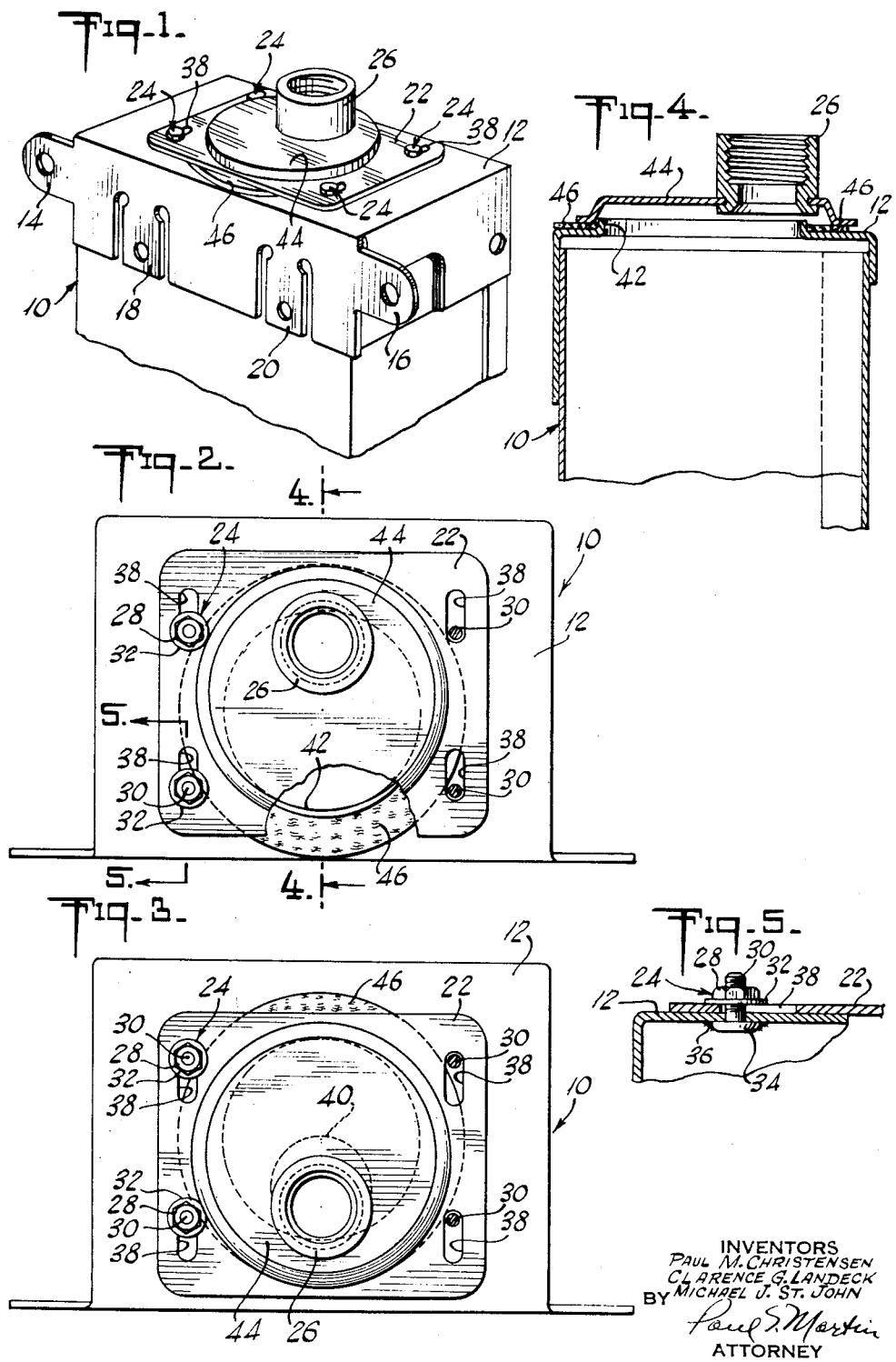

2,950,837

WATERPROOF ENCLOSURE FOR ELECTRICAL DEVICES

Paul M. Christensen, West Orange, Clarence G. Landeck, Scotch Plains, and Michael J. St. John, Essex Fells, N.J., assignors to Federal Pacific Electric Company, a corporation of Delaware Filed July 3, 1957, Ser. No. 669,840

6 Claims. (Cl. 220—3.7)

This invention relates to waterproof enclosures for electrical devices.

A typical electrical service entrance installation consists of a set of overhead wires commonly called a "service drop," connected to the utility lines. From the overhead wires, wires are connected through an "entrance head" and in turn through conduit to a meter socket. A connection is then provided from the meter socket to an entrance switch which may be an indoor or outdoor switch box. For outdoor service, as is common for farmstead installations, it is conventional to use a weatherproofed fused main switch in an enclosure mounted outdoors on a pole or building wall. A conduit nipple extends from the bottom of the meter socket enclosure to the top of the switch enclosure. A typical problem arising in such an installation is that an offset is normally required in the section of conduit nipple between the meter socket and the outdoor switch enclosure. It is a rather difficult fabrication job to provide the relatively short conduit nipple with a proper offset to enable the coupling of the switch enclosure to the meter. Further, fabrication of this type on the job site is costly and time consuming and is therefore objectionable. There is disclosed hereinafter an enclosure for electrical devices providing means for quickly and simply adjusting the location of the enclosure connector so as to permit of precise alignment with the connector of the meter socket.

It is accordingly a feature of this invention to provide an enclosure for electrical devices having an entrance connector in the top portion thereof, including means for varying the location so as to permit ready alignment with other apparatus. Another feature of the present invention resides in means for preventing the admission of moisture through the top of the enclosure.

Further features of the invention and its other aspects and advantages will become clear from the following detailed disclosure of an illustrative embodiment shown in the accompanying drawings. In those drawings:

Fig. 1 is an isometric showing of the top portion of an enclosure incorporating the features of this invention;

Fig. 2 is a top view of the enclosure showing an adjustable cover plate located at an extreme position, with a portion of the cover plate broken away so as to disclose the internal construction and with two studs shown partially sectioned so as to expose elongated slots;

Fig. 3 is a top view of the enclosure showing the cover plate rotated 180 degrees and positioned in the other extreme position with two studs shown in section;

Fig. 4 is a cross section along the line 4—4 of Fig. 2; and

Fig. 5 is an enlarged cross section of a fastening means and clamped members shown in Fig. 2 along the lines 5—5 therein.

Referring now to the drawings, sheet metal enclosure 10 is provided a sheet metal top 12, which incorporates mounting lugs 14, 16, 18 and 20. For certain installations, the installer may choose to employ mounting lugs 18 and 20 which may be bent outwardly so as to render them accessible. Cover plate 22 is mounted on top member 12 by means of four fasteners 24. An off-center conduit connector 26 is attached to cover plate 22. Cover plate 22 may be positioned as shown in Fig. 2 with the connector 26 nearest the front of the enclosure, or alternatively, as in Fig. 3, cover plate 22 may be reversed with connector 26 positioned nearest the rear of the enclosure.

Referring now to Fig. 5, fasteners 24 are shown in detail. The head 34 of stud 30 is attached to the enclosure top 12 by means of a waterproof weld 36. Each stud 30 extends through a corresponding elongated slot 38 in member 22. Nut 28 on stud 30 is tightened against a washer 32 to secure plate 22 in place. By loosening nuts 28, cover plate 22 may be adjusted, with relation to the front and back of the enclosure, so as to permit a range of adjustment for alignment of connector 26 with the conduit extending, conventionally, from the meter unit above.

By positioning the connector 26 in an off-centered position with respect to the pattern of slots 38 in cover plate 22, a greater range of adjustment is obtainable than if the connector were at the center. Cover plate 22 may be removed together with off-centered connector 26 and reversed 180 degrees to assume the position shown in Fig. 3. In Fig. 3 dashed circle 40 indicates the position occupied by the connector 26 when cover plate 22 is located at the other extreme position permitted by the length of slots 38. A similar range of adjustment is available at the 180° reversed position shown in Fig. 2.

A waterproof seal is provided between plate 22 and enclosure 10, best shown in Fig. 4. Top member 12 is provided with an opening defined by a raised lip portion 42. Cover plate 22 in turn is provided with a raised recessed portion 44, to provide clearance for lip 42 and clearance between connector 26 and lip 42. The diameter of recessed portion 44 is larger than that of lip portion 42. This permits the movement of cover plate 22 from one extreme position to the other without interference. Sealing is provided by the compression of a gasket 46 of resilient material, such as for example, neoprene rubber, positioned between the lower face of cover plate 22 and the upper surface of enclosure top 12. Connector 26 is fastened to portion 44 of plate 22 by means of a spinning operation so as to provide a water-tight joint.

A wiring passage is available through conduit connector 26 and the opening defined by lip 42 through the range of adjustment allowed by slots 38 and in both positions (Figs. 2 and 3) of the off-center connector. Throughout this range of adjustment plate 22 provides a sealing surface bearing against gasket 46 all around lip 42.

The foregoing illustrative description of the invention as applied to the particular embodiments shown in the drawings is naturally susceptible of variation and varied substitution and application by those skilled in the art and, accordingly, the appending claims should be broadly construed in a manner consistent with the full spirit and scope of the invention.

What we claim is:

1. An enclosure for electrical devices having a top formed with a raised lip portion defining an opening extending through said top, a resilient gasket member surrounding said raised lip portion, a cover plate comprising a flat border portion provided with a plurality of parallel elongated slots and a recessed portion adapted to fit over said raised lip portion, said recessed portion being provided with a conduit connector, fastening means passing through said slots and adapted to secure said cover plate to said enclosure top in any selected position through a range afforded by said slots and said slots being outside the inner limit of the gasket in any selected position of the cover plate, said recessed portion being of sufficiently greater extent than said lip to receive said lip in all positions thereof and said opening being large enough to provide a wiring passage from said conduit connector into said enclosure in all selected positions of the cover.

2. The enclosure of claim 1 wherein said fasteners comprise threaded studs each having a waterproof joint to said enclosure top, each stud passing through a corresponding slot, and a nut on each stud.

3. An enclosure for electrical devices having a top, means defining an opening through said top, a cover plate comprising a flat border portion provided with a plurality of parallel elongated slots, said cover plate being provided with a conduit connector secured off-center on a line parallel to said slots, fastening means extending integrally from said top through said slots and having nuts external to said cover plate and adapted to secure said cover plate to said enclosure top in any selected position through a range of positions, said slots being arranged to admit said fastening means in reversed positions of the cover for shifting the off-centered conduit connector relative to said enclosure, and a gasket about said opening engaged by said flat border portion to provide a water-tight seal between said top member and said cover plate in all said selected positions, and said opening being large enough to afford a direct wiring passage from said connector into said enclosure in the range of positions and reversed positions of the cover plate and said slots being disposed outside the inner edge of the gasket in all the adjusted positions of the cover plate.

4. An enclosure for electrical devices having a top provided with an opening therethrough, a cover plate adapted to fit against the top and having sufficient lateral extent to cover said opening in a range of adjusted positions thereon, said cover plate including a conduit connector, and a gasket against said top and about said opening for providing a water-tight seal between said enclosure top and said cover plate, and means to fasten said cover plate in any selected position through a range of positions including screws having a permanent waterproof joint to said top and nuts on the screws at the external face of said cover plate opposite said gasket, parallel slots in said cover plate being provided through which said screws project, said slots being outside the inner limit of said gasket in all positions of adjustment of said cover plate.

5. An enclosure for electrical devices having a top provided with an opening therethrough, a cover plate adapted to fit against the top and having sufficient lateral extent to cover said opening in a range of adjusted positions thereon, said cover plate including a conduit connector, and a gasket against said top and about said opening for providing a water-tight seal between said enclosure top and said cover plate, and means to fasten said cover plate in any selected position through a range of positions including screws united to said top, parallel slots in said cover plate being provided through which said screws project, said slots being outside the inner limit of said gasket in all positions of adjustment of said cover plate, said conduit connector being disposed on said cover plate eccentric thereto along a line parallel to said slots.

6. An enclosure for electrical devices having a top formed with a raised lip portion defining an opening extending through said top, a resilient gasket surrounding said raised lip portion, a cover plate comprising a flat border portion provided with a plurality of elongated parallel slots and a recessed portion adapted to fit over said raised lip portion, said recessed portion being provided with a conduit connector, said connector being disposed eccentrically with respect to said recessed portion along a line parallel to said elongated slots, fastening means passing through said slots and adapted to secure the cover plate to said enclosure top in any selected position through a range afforded by said slots and said slots being outside the inner limit of said gasket in any selected position of the cover plate, said recessed portion being of sufficiently greater extent than said lip to receive the lip in all selected positions thereof and said opening being large enough to provide a wiring passage from said conduit connector into said enclosure in all selected positions of said cover plate.

References Cited in the file of this patent

UNITED STATES PATENTS

| | | |
|---|---|---|
| 699,215 | Muller | May 6, 1902 |
| 1,173,854 | Pearch | Feb. 29, 1916 |
| 1,462,209 | Miner | July 17, 1923 |
| 1,788,366 | Anderson | Jan. 13, 1931 |
| 1,796,064 | Swanson | Mar. 10, 1931 |
| 1,869,646 | Anderson | Aug. 2, 1932 |
| 2,295,416 | Madison | Sept. 8, 1942 |
| 2,680,533 | Cole | June 8, 1954 |